(12) United States Patent
Thuröe

(10) Patent No.: US 9,531,858 B2
(45) Date of Patent: Dec. 27, 2016

(54) METHODS OF RESPONDING TO AN ORIENTATION OR MOTION OF A PORTABLE ELECTRONIC DEVICE, AND RELATED DEVICES

(75) Inventor: Andreas Thuröe, Limhamn (SE)

(73) Assignee: Sony Corporation, Tokyo (JP)

( * ) Notice: Subject to any disclaimer, the term of this patent is extended or adjusted under 35 U.S.C. 154(b) by 38 days.

(21) Appl. No.: 14/369,738

(22) PCT Filed: Feb. 27, 2012

(86) PCT No.: PCT/IB2012/000357
§ 371 (c)(1),
(2), (4) Date: Jun. 30, 2014

(87) PCT Pub. No.: WO2013/128218
PCT Pub. Date: Sep. 6, 2013

(65) Prior Publication Data
US 2014/0357189 A1  Dec. 4, 2014

(51) Int. Cl.
*H04M 1/725* (2006.01)
*H04B 5/00* (2006.01)
*H04W 4/00* (2009.01)

(52) U.S. Cl.
CPC ....... *H04M 1/72527* (2013.01); *H04B 5/0031* (2013.01); *H04M 1/7253* (2013.01); *H04W 4/008* (2013.01); *H04M 2250/04* (2013.01); *H04M 2250/12* (2013.01)

(58) Field of Classification Search
None
See application file for complete search history.

(56) References Cited

U.S. PATENT DOCUMENTS

| 2005/0210417 A1* | 9/2005 | Marvit ................. G06F 1/1613 715/863 |
| 2008/0039212 A1 | 2/2008 | Ahlgren et al. |
| 2008/0078831 A1 | 4/2008 | Johnson et al. |
| 2008/0113655 A1* | 5/2008 | Angelhag ............... H04L 67/16 455/414.2 |

(Continued)

FOREIGN PATENT DOCUMENTS

WO  WO2007112787 A1  10/2007

OTHER PUBLICATIONS

Notification Concerning Transmittal of International Preliminary Report on Patentability in corresponding PCT Application No. PCT/IB2012/000357, mailed Sep. 12, 2014 (7 pages).

(Continued)

*Primary Examiner* — Alejandro Rivero
(74) *Attorney, Agent, or Firm* — Myers Bigel, P.A.

(57) ABSTRACT

A method of responding to an orientation or motion of a portable electronic device may include receiving a plurality of commands at the portable electronic device from a proximately-located short-range radio frequency (RF) device through a direct point-to-point short-range RF communication link. The method may also include identifying the orientation or motion of the portable electronic device while the portable electronic device is proximately located to the short-range RF device. The method may further include selecting one of the plurality of commands, at the portable electronic device, in response to identifying the orientation or motion of the portable electronic device.

16 Claims, 14 Drawing Sheets

(56) References Cited

U.S. PATENT DOCUMENTS

| | | | |
|---|---|---|---|
| 2011/0053503 A1* | 3/2011 | Witschnig | H04B 5/0031 455/41.1 |
| 2011/0055774 A1 | 3/2011 | Kim et al. | |
| 2013/0171929 A1* | 7/2013 | Adams | H04W 4/008 455/41.1 |

OTHER PUBLICATIONS

International Search Report Corresponding to International Application No. PCT/IB2012/000357; Date of Mailing: Oct. 18, 2012; 3 Pages.

* cited by examiner

METHODS OF RESPONDING TO AN ORIENTATION OR MOTION OF A PORTABLE ELECTRONIC DEVICE, AND RELATED DEVICES

CROSS-REFERENCE TO RELATED APPLICATION

This application is a 35 U.S.C. §371 national stage application of PCT International Application No. PCT/IB2012/000357, filed on 27 Feb. 2012, the disclosure and content of which is incorporated by reference herein as if set forth in its entirety.

FIELD

The present inventive concept generally relates to the field of communications and, more particularly, to methods of responding to an orientation or motion of a portable electronic device.

BACKGROUND

Short-range Radio Frequency (RF) wireless communications may include Near Field Communications (NFC). NFC is a wireless communication technology that enables short-range communications between closely-positioned (e.g., less than twenty (20.0) centimeters (cm)) wireless devices. NFC may operate at a frequency of 13.56 Megahertz (MHz), which, in some countries, falls in an unlicensed ISM (industrial, scientific, medical) frequency range. The 13.56 MHz operating frequency may also be used for Radio Frequency Identification (RFID) applications. Thus, an NFC device can communicate with other NFC devices in a peer-to-peer communication mode, as well as with RFID devices in a read/write mode. Like RFID, NFC uses magnetic field induction for communication. In magnetic field induction, two communicating devices each include loop antennas. When placed in close proximity (e.g., less than twenty (20.0) cm), an electrical signal on one of the loop antennas can induce an electrical signal in the other of the loop antennas, thus providing a communication path between the devices.

An NFC device (e.g., an NFC "tag") may be used to provide information (e.g., retail payment information) to a mobile phone. For example, a user of the mobile phone may initiate or finalize a communication session with the NFC tag by bringing the mobile phone into close proximity with the NFC tag. One example of such a communication may be communicating with an NFC tag near a painting to receive more information at the mobile phone about the artist of the painting.

SUMMARY

Various embodiments of the present inventive concept include a method of responding to an orientation or motion of a portable electronic device. The method may include receiving a plurality of commands at the portable electronic device from a proximately-located short-range radio frequency (RF) device through a direct point-to-point short-range RF communication link. The method may also include identifying the orientation or motion of the portable electronic device while the portable electronic device is proximately located to the short-range RF device. The method may further include selecting one of the plurality of commands, at the portable electronic device, in response to identifying the orientation or motion of the portable electronic device.

In various further embodiments, the short-range RF communication link may include a magnetically-coupled near field communication (NFC) link. In other words, the plurality of commands may be received at the portable electronic device through the NFC link.

Various further embodiments provide that the short-range RF device may include an NFC tag. Additionally, the method may further include powering the NFC tag through magnetic coupling to a power source of the portable electronic device to initiate transfer of the plurality of commands to the portable electronic device through the NFC link.

In various further embodiments, selecting one of the plurality of commands may include the following actions by the portable electronic device: interpreting the plurality of commands; and performing the one of the plurality of commands that is selected by the portable electronic device without further input from a user. In other words, identifying the orientation or motion and selecting the one of the plurality of commands may not require user input beyond simply orienting and/or moving the portable electronic device.

Various further embodiments provide that performing the one of the plurality of commands that is selected may include transmitting a request from the portable electronic device to a network to request information from a network node.

In various further embodiments, transmitting the request from the portable electronic device to a network may include requesting a uniform resource locator (URL) that is included in the one of the plurality of commands that is selected by the portable electronic device.

Various further embodiments provide that each of the plurality of commands may be associated with a different URL.

In various further embodiments, interpreting the plurality of commands may include comparing the plurality of commands with the orientation or motion that is identified by the portable electronic device.

Various further embodiments provide that the method may further include: receiving from the short-range RF device at the portable electronic device an indication of a corresponding orientation or motion that will trigger performing a respective one of the plurality of commands; and displaying information communicating the indication on a display device of the portable electronic device.

In various further embodiments, comparing the plurality of commands with the orientation or motion that is identified by the portable electronic device may include using an application that associates each of the plurality of commands with a corresponding orientation or motion that will trigger performing a respective one of the plurality of commands.

Various further embodiments provide that identifying the orientation or motion of the portable electronic device may include processing information received from a motion sensor, a rotation sensor, a tap sensor, a proximity sensor, and/or camera of the portable electronic device while the portable electronic device is proximately located to the short-range RF device, to match the orientation or motion of the portable electronic device to one of a plurality of known orientations or motions.

In various further embodiments, the method may further include, before identifying the orientation or motion of the portable electronic device, displaying on a display device of the portable electronic device a list that identifies each of the plurality of commands, along with a respective orientation or motion that corresponds to each of the plurality of commands.

Various further embodiments provide that identifying the orientation or motion of the portable electronic device may be triggered in response to receiving the plurality of commands at the portable electronic device.

In various further embodiments, the short-range RF device may transmit each of the plurality of commands to the portable electronic device grouped in a serial data stream. Additionally, selecting one of the plurality of commands may include selecting only one of the plurality of commands.

According to various embodiments, a portable electronic device may include a short-range radio frequency (RF) communication module configured to receive a plurality of commands from a proximately-located short-range RF device through a direct point-to-point short-range RF communication link. The portable electronic device may also include a sensor configured to identify occurrence of one of a plurality of orientations and/or motions of the portable electronic device while proximately located to the short-range RF device. The portable electronic device may be further configured to select one of the plurality of commands in response to identifying the occurrence of the one of a plurality of orientations and/or motions of the portable electronic device.

In various further embodiments, the short-range RF communication module may include a near field communication (NFC) module. Additionally, the short-range RF communication link may include a magnetically-coupled NFC link. Moreover, the short-range RF device includes an NFC tag that is powered through magnetic coupling to a power source of the portable electronic device. Furthermore, the sensor may include at least one of a motion sensor, a rotation sensor, a tap sensor, a proximity sensor, and a camera.

Various further embodiments provide that selecting one of the plurality of commands may include: comparing the plurality of commands with the one of a plurality of orientations and/or motions of the portable electronic device that is identified by the sensor; and performing the one of the plurality of commands that is selected.

In various further embodiments, the portable electronic device may further include a transceiver. Additionally, performing the one of the plurality of commands that is selected may include transmitting a request via the transceiver to a network.

Various further embodiments provide that transmitting the request via the transceiver to a network may include requesting a uniform resource locator (URL). Additionally, the URL may be associated with the one of the plurality of commands that is selected by the portable electronic device. Furthermore, each of the plurality of commands may be associated with a different URL.

According to various embodiments, a method of responding to an orientation or motion of a portable electronic device may include receiving a plurality of commands grouped in a serial data stream at the portable electronic device from a proximately-located short-range radio frequency (RF) device through a direct point-to-point short-range RF communication link. The method may also include identifying the orientation or motion of the portable electronic device while the portable electronic device is proximately located to the short-range RF device. The method may further include comparing the plurality of commands with the orientation or motion that is identified by the portable electronic device. The method may additionally include performing only one of the plurality of commands, by transmitting a request from the portable electronic device to a network to initiate a download and/or access a website, in response to comparing the plurality of commands with the orientation or motion that is identified by the portable electronic device.

Other methods and/or devices according to embodiments of the inventive concept will be or become apparent to one with skill in the art upon review of the following drawings and detailed description. It is intended that all such additional devices and/or systems be included within this description, be within the scope of the present inventive concept, and be protected by the accompanying claims. Moreover, it is intended that all embodiments disclosed herein can be implemented separately or combined in any way and/or combination.

DETAILED DESCRIPTION OF EMBODIMENTS

Figure 1:
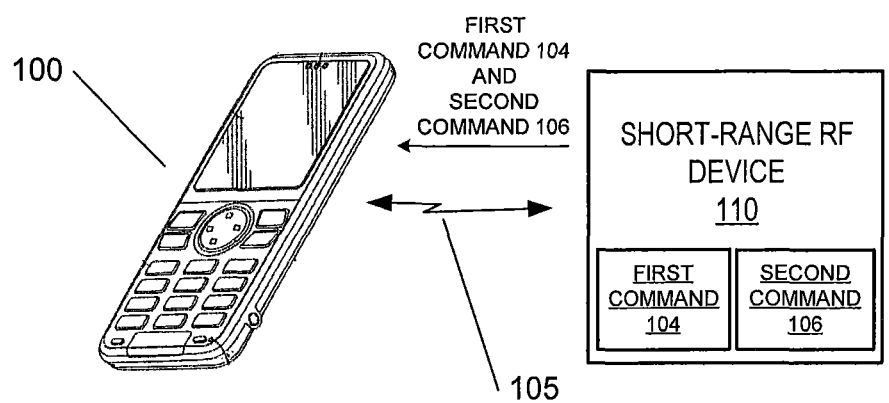
FIG. 1 illustrates a portable electronic device and a short-range Radio Frequency (RF) device that communicate with each other through a short-range RF communication link, according to various embodiments of the present inventive concept.

The present inventive concept now will be described more fully with reference to the accompanying drawings, in which embodiments of the inventive concept are shown. However, the present application should not be construed as limited to the embodiments set forth herein. Rather, these embodiments are provided so that this disclosure will be thorough and complete, and to fully convey the scope of the embodiments to those skilled in the art. Like reference numbers refer to like elements throughout.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein the term "and/or" includes any and all combinations of one or more of the associated listed items.

Spatially relative terms, such as "above", "below", "upper", "lower" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms first, second, etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which these embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is to be understood that the functions/acts indicated in the illustrated blocks may occur out of the order noted in the operational illustrations. For example, two blocks shown in succession may in fact be executed substantially concurrently or the blocks may sometimes be executed in the reverse order, depending upon the functionality/acts involved.

Although Near Field Communication (NFC) links have been used to provide a given function (e.g., to facilitate payments for merchandise or to provide other information) for users of devices communicating through the NFC links, communication sessions using the NFC links have been somewhat basic (e.g., limited to the particular function). However, various embodiments of the methods and related devices described herein may provide options to a user of a portable electronic device in a relatively easily-accessible manner. For example, various embodiments described herein may use short-range Radio Frequency (RF) wireless communications (e.g., NFC communications) to provide multiple options to the user of the portable electronic device. In particular, in one example, an NFC tag may transfer a plurality of commands (e.g., different options/instructions/actions that can be performed by the portable electronic device) together (e.g., grouped in a serial data stream) to the portable electronic device through an NFC communication link.

Moreover, various embodiments described herein may provide receipt of all of the commands, and execution of a particular one of the commands, at the portable electronic device without requiring additional user inputs through manipulation of a user interface (e.g., keypad/keyboard/touch interface) beyond the particular orientation or motion (e.g., gesture) of the portable electronic device. For example, the plurality of commands may be transferred from the NFC tag to the portable electronic device in response to establishing an NFC communication link without requiring the user to look at a display of the portable electronic device and provide further input to the portable electronic device through a user interface. Additionally, the portable electronic device may select a particular one of the plurality of commands in response to identifying the particular orientation or motion of the portable electronic device without requiring the user to look at a display of the portable electronic device and provide further input to the portable electronic device through a user interface.

Referring to FIG. 1, an illustration is provided of a portable electronic device 100 and a short-range RF device 110 that may communicate with each other through a short-range RF wireless communication link 105, according to various embodiments of the present inventive concept. The short-range RF wireless communication link 105 may be a direct point-to-point link (e.g., in contrast with a cellular or Wireless Local Area Network (WLAN) link) between the portable electronic device 100 and the short-range RF device 110. The short-range RF device 110 may transfer a plurality of commands to the portable electronic device 100 through the short-range RF wireless communication link 105. For example, the short-range RF device 110 may be configured to transmit a plurality of different commands (e.g., commands to access/download audio, video, websites, and/or information content/files) to the portable electronic device 100. As an example, the short-range RF device 110 may be configured to transfer a first command 104 and a second command 106 to the portable electronic device 100. Although the first and second commands 104 and 106 are illustrated in FIG. 1 as an example, it will be understood that more than two commands (e.g., three, four, or more commands) may be transmitted together from the short-range RF device 110 to the portable electronic device 100.

Figure 2:
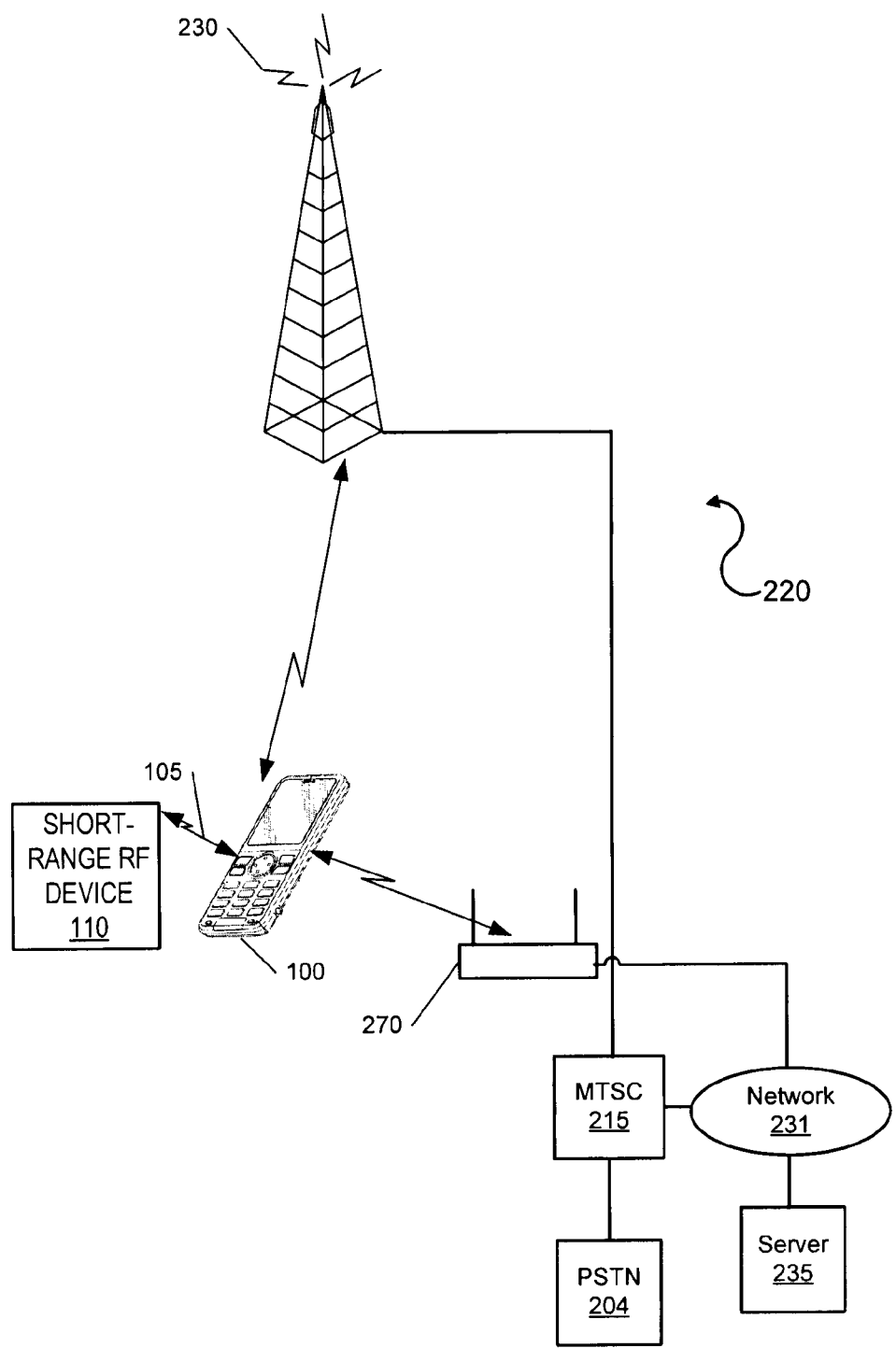
FIG. 2 is a schematic illustration of a wireless communications network that provides service to the portable electronic device, according to various embodiments of the present inventive concept.

Referring now to FIG. 2, a schematic illustration is provided of a wireless communications network 220 that provides service to the portable electronic device 100, according to various embodiments of the present inventive concept. The wireless communications network 220 may include a base station transceiver 230 (e.g., a cellular base station), a local wireless network transceiver 270 (e.g., WLAN or Bluetooth), a Mobile Telephone Switching Center (MTSC) 215, and/or a Public Service Telephone Network (PSTN) 204 (i.e., a "landline" network). As also shown in FIG. 2, the MTSC 215 is coupled to a computer server 235 via a network 231, such as the Internet. The local wireless network transceiver 270 may also be connected to the network 231. Accordingly, the portable electronic device 100 may receive a plurality of commands from the short-range RF device 110, and may then access the computer server 235 (e.g., to access a website and/or to upload/download information/audio/video) via the local wireless network transceiver 270 or the base station transceiver 230 in response to a selected one of the plurality of commands.

Figure 3:
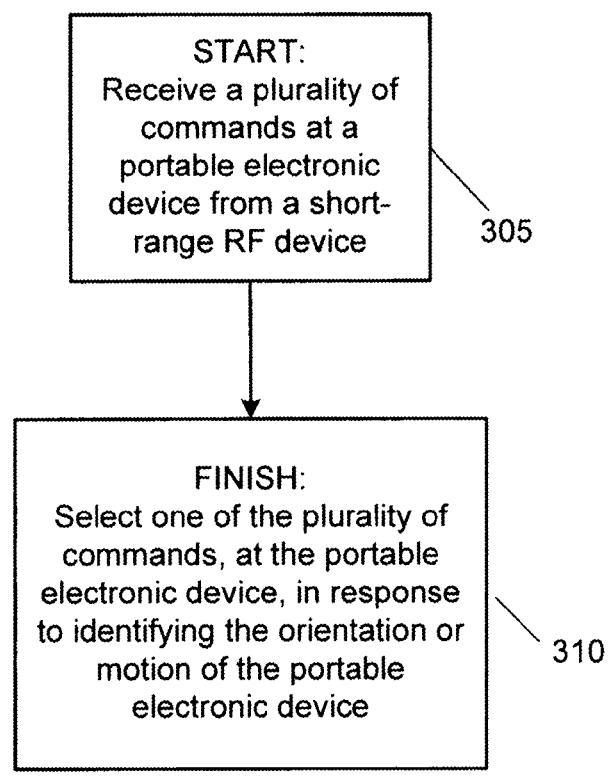
FIG. 3 is a flowchart illustrating operations of responding to an orientation or motion of the portable electronic device, according to various embodiments of the present inventive concept.

Referring now to FIG. 3, a flowchart is provided illustrating operations of responding to an orientation or motion of the portable electronic device 100, according to various embodiments of the present inventive concept. The motion or orientation of the portable electronic device 100 occurs while the portable electronic device 100 is proximately located to short-range RF device 110. For example, the motion or orientation may be a shake or a rotation (e.g., a spin or a flip) of the portable electronic device 100. In another example, the motion or orientation may be a tap (or multiple taps) on the portable electronic device 100 (e.g., taps with a stylus or a user's finger), or a tap (or multiple taps) by the portable electronic device 100 on the short-range RF device 110. In a further example, the motion or orientation may be an orientation of the portable electronic device 100 with respect to the ground or with respect to the short-range RF device 110. For example, the orientation may be that a portion (e.g., a display) of the portable electronic device 100 faces (or doesn't face, or is oriented at a given angle with respect to) the short-range RF device 110. In an additional example, the motion or orientation may be that the portable electronic device 100 is held (e.g., held substantially motionless) near or on the short-range RF device 110 for a given amount of time. Moreover, the motion or orientation of the portable electronic device 100 may be a combination of motion and orientation (e.g., rotation combined with a rightward orientation before/after/during the rotation), or may only be one of a motion or an orientation.

Referring still to FIG. 3, the operations of responding to an orientation or motion of the portable electronic device 100 may include receiving a plurality of commands (e.g., the first command 104 and the second command 106) at the portable electronic device 100 from the short-range RF device 110 (Block 305). The portable electronic device 100 and the short-range RF device 110 may be proximately located to each other. For example, the short-range RF device 110 and the portable electronic device 100 may be within about four (4.0) centimeters (cm) of each other. In another example, the short-range RF device 110 and the portable electronic device 100 may be within about twenty (20.0) cm of each other.

As illustrated in Block 310 of FIG. 3, according to various embodiments, the operations of responding to an orientation or motion of the portable electronic device 100 may further include selecting one of the plurality of commands, at the portable electronic device 100, in response to identifying the orientation or motion of the portable electronic device 100. For example, the portable electronic device 100 may identify the orientation or motion as being a shake, spin, flip, tilt, tap, hold/lack-of-motion, given angle-of-facing, given direction-of-facing, etc.

Figure 4A:
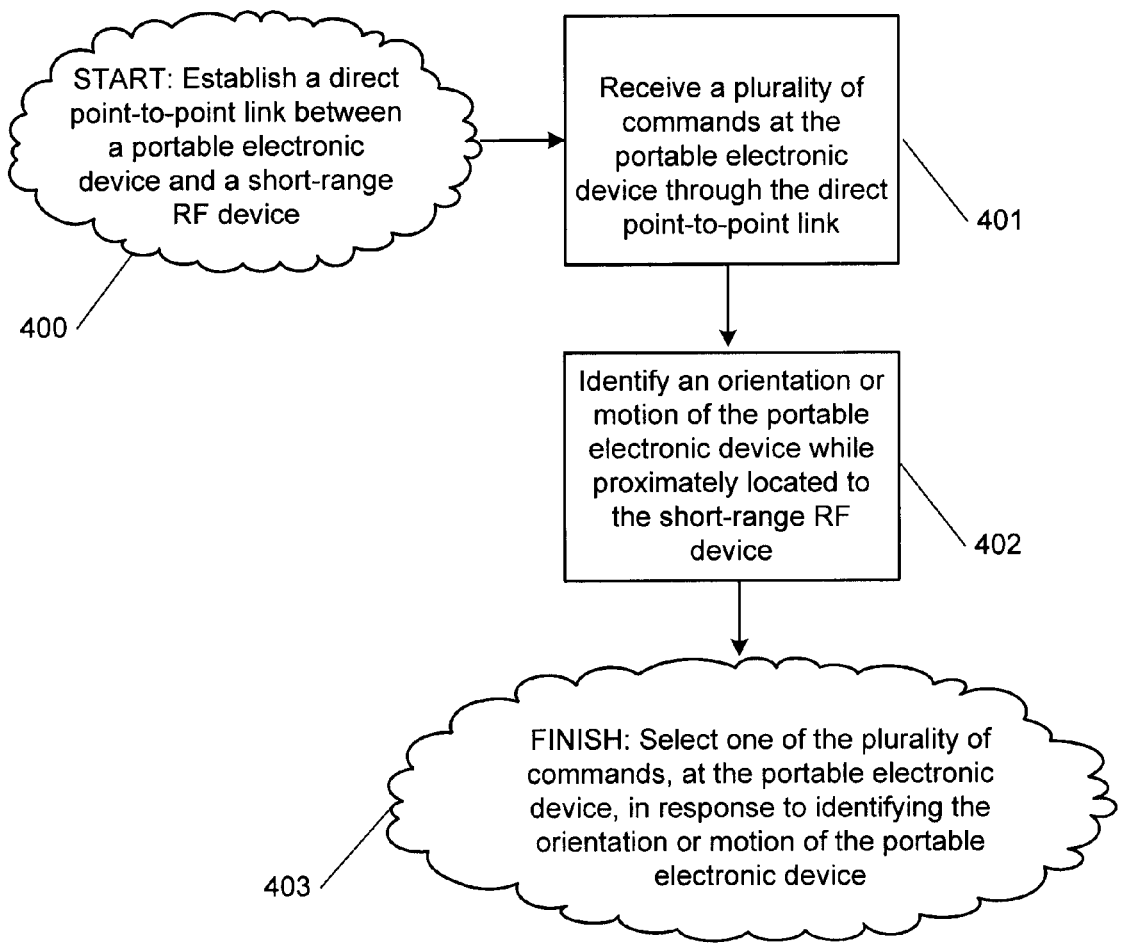
FIGS. 4A-4C are flowcharts illustrating operations that include identifying an orientation or motion of the portable electronic device, according to various embodiments of the present inventive concept.
Figure 4B:
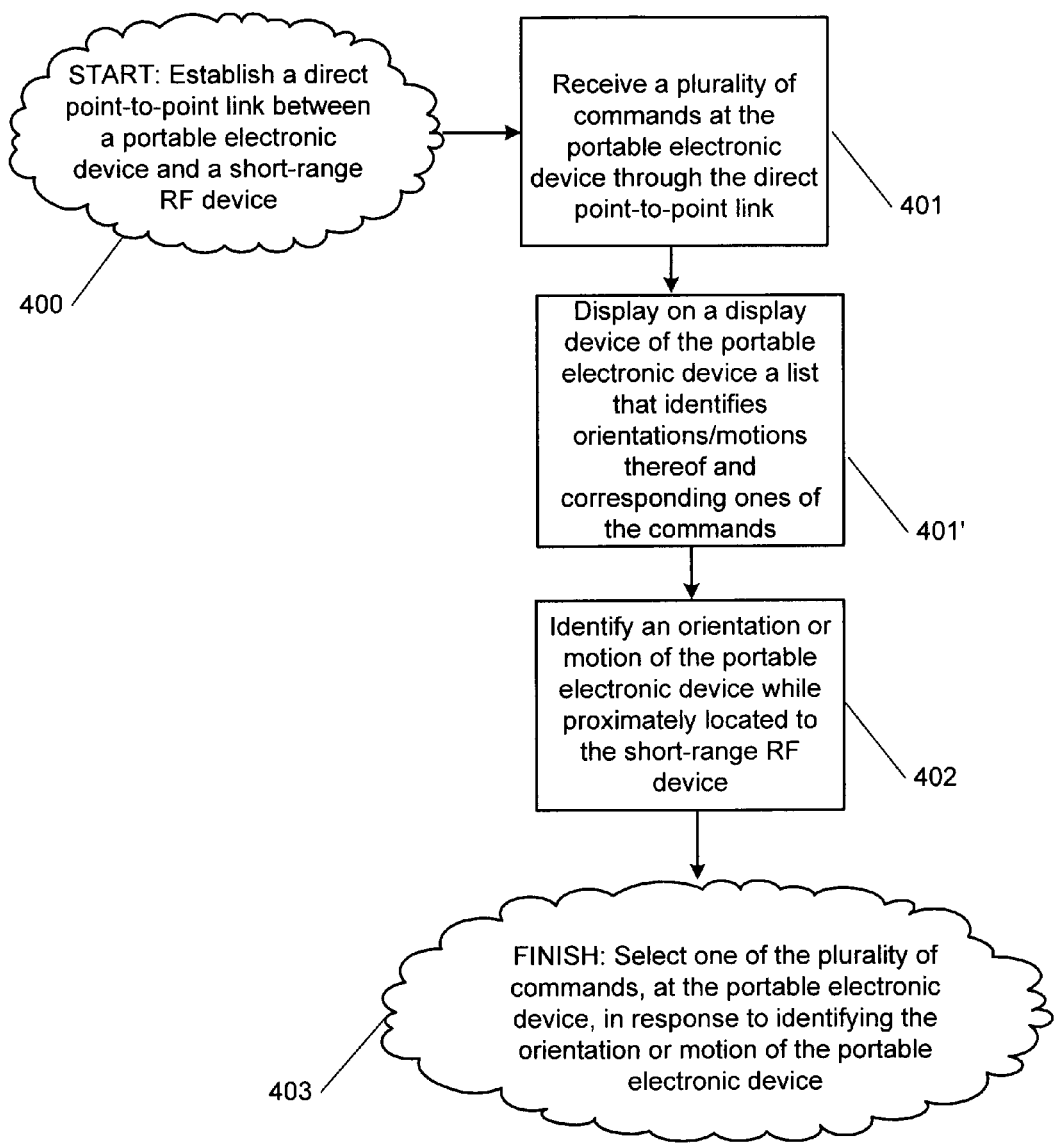
Figure 4C:
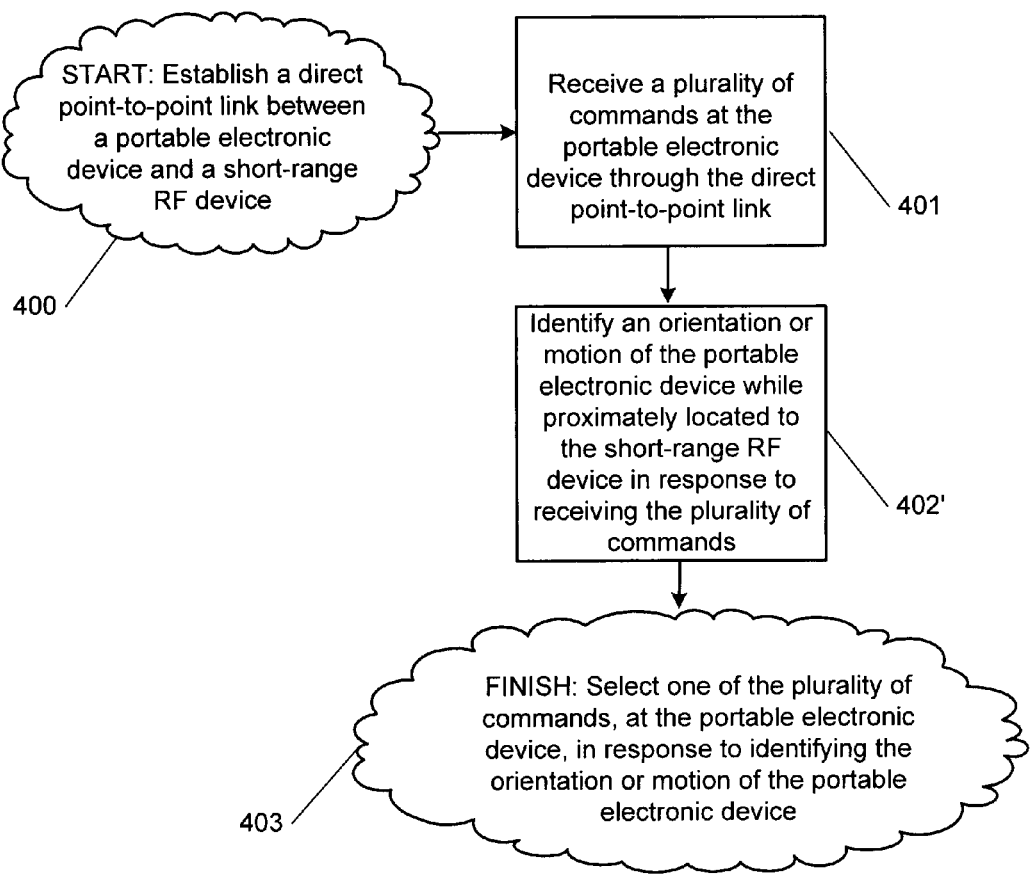

Referring now to FIGS. 4A-4C, flowcharts are provided illustrating operations that include identifying an orientation or motion of the portable electronic device 100, according to various embodiments of the present inventive concept. Referring to FIG. 4A, the operations include establishing a direct point-to-point link 105 between the portable electronic device 100 and the short-range RF device 110 (Block 400). In response, a plurality of commands are received at the portable electronic device 100 through the direct point-to-point link 105 (Block 401). Additionally, the portable electronic device 100 identifies an orientation or motion of the portable electronic device 100 while the portable electronic device 100 is proximately located to the short-range RF device 110 (Block 402). In various embodiments, the portable electronic device 100 may make this identification in response to receiving the plurality of commands. Alternatively, the portable electronic device 100 may make this identification in response to establishing the direct point-to-point link 105 (e.g., independently of receiving the plurality of commands). After receiving the plurality of commands and identifying the orientation or motion of the portable electronic device 100, the portable electronic device 100 selects one of the plurality of commands in response to identifying the orientation or motion of the portable electronic device 100 (Block 403).

Referring to FIG. 4B, the operations include Blocks 400-403 of FIG. 4A and further include Block 401'. In particular, after receiving the plurality of commands (Block 401), the portable electronic device 100 displays a list that identifies orientations/motions of the portable electronic device 100 and corresponding ones of the plurality of commands (Block 401'). For example, the portable electronic device 100 may display a list that identifies first, second, and third commands and corresponding first, second, and third orientations/motions of the portable electronic device 100 that trigger execution of the respective commands. In various embodiments, the portable electronic device 100 may display the list before identifying the orientation or motion of the portable electronic device 100 (Block 402). Alternatively, the portable electronic device 100 may display the list after identifying the orientation or motion of the portable electronic device 100 (Block 402).

Referring to FIG. 4C, the operations include Blocks 400, 401, and 403 of FIG. 4A, and include Block 402' instead of Block 402. In particular, after receiving the plurality of commands (Block 401), the portable electronic device 100 identifies an orientation or motion of the portable electronic device 100 while the portable electronic device 100 is proximately located to the short-range RF device 110, in response to receiving the plurality of commands (Block 402'). In other words, the identification of the orientation or motion of the portable electronic device 100 is triggered by receiving the plurality of commands. In various alternative embodiments, however, the portable electronic device 100 may make this identification independently of receiving the plurality of commands.

Figure 5:
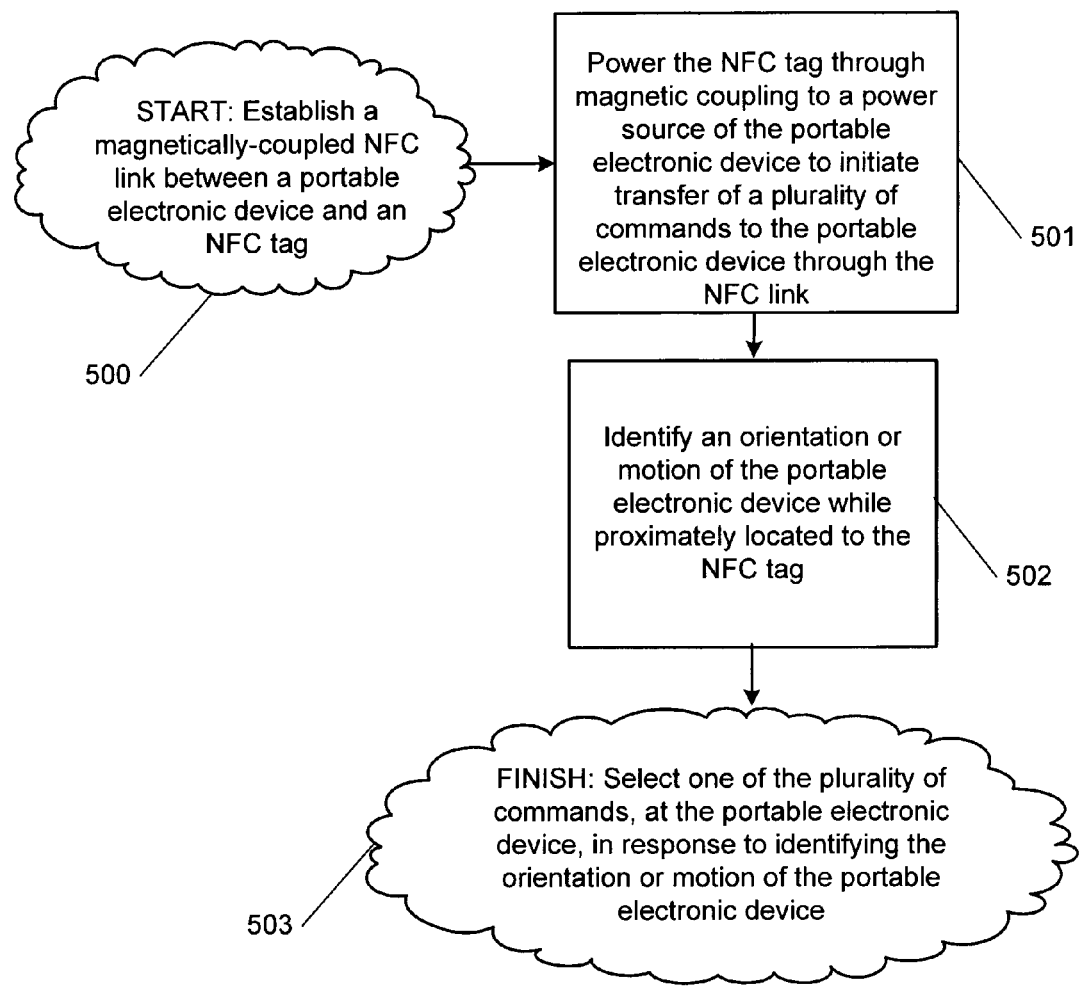
FIG. 5 is a flowchart illustrating operations of transferring a plurality of commands from a Near Field Communication (NFC) tag to the portable electronic device, according to various embodiments of the present inventive concept.

Referring now to FIG. 5, a flowchart is provided illustrating operations of transferring a plurality of commands from a Near Field Communication (NFC) tag to the portable electronic device 100, according to various embodiments of the present inventive concept. For example, referring again to FIG. 1, the short-range RF device 110 may be an NFC tag. Also, the short-range RF communication link 105 may be an NFC link. As such, according to various embodiments, the operations of responding to an orientation or motion of the portable electronic device 100 include establishing a magnetically-coupled NFC link 105 between the portable electronic device 100 and the NFC tag 110 (Block 500). The operations may also include powering the NFC tag 110 through magnetic coupling to a power source of the portable electronic device 100 to initiate transfer of a plurality of commands from the NFC tag 110 to the portable electronic device 100 through the NFC link 105 (Block 501). The operations may further include identifying an orientation or motion of the portable electronic device 100 while the portable electronic device 100 is proximately located to the NFC tag 110 (Block 502). This identification of the orientation or motion may be triggered by receipt of the plurality of commands at the portable electronic device 100, or may be independent of such receipt. Moreover, the operations may further include selecting one of the plurality of commands, at the portable electronic device 100, in response to identifying the orientation or motion of the portable electronic device 100 (Block 503).

Figure 6:
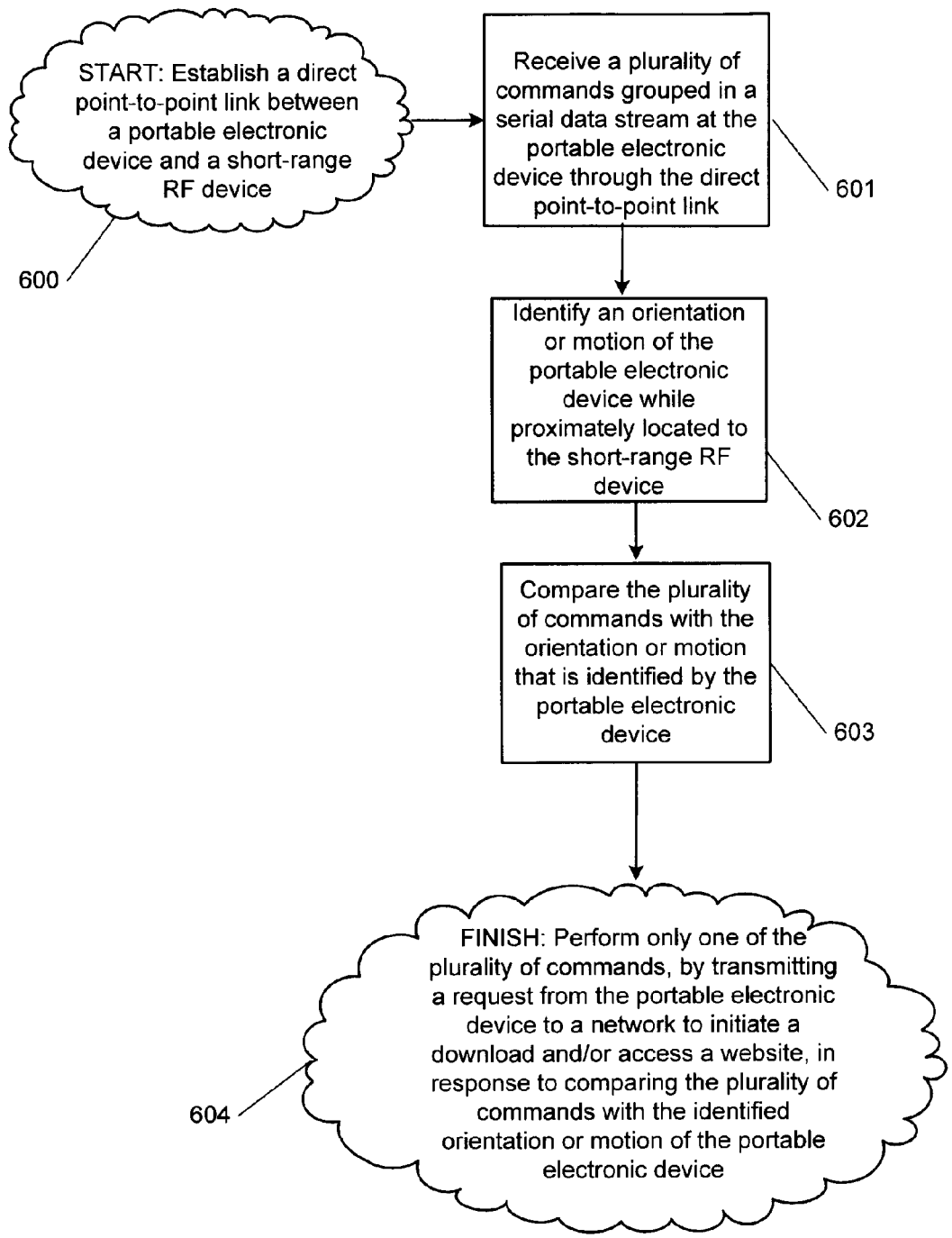
FIG. 6 is a flowchart illustrating operations that include comparing a plurality of commands with an orientation or motion that is identified by the portable electronic device, according to various embodiments of the present inventive concept.

Referring now to FIG. 6, a flowchart is provided illustrating operations that include comparing a plurality of commands with an orientation or motion that is identified by the portable electronic device 100, according to various embodiments of the present inventive concept. The operations include establishing a direct point-to-point link 105 between the portable electronic device 100 and the short-range RF device 110 (Block 600). In response, a plurality of commands (which are grouped together in a serial data stream) are received at the portable electronic device 100 through the direct point-to-point link 105 (Block 601). Additionally, the portable electronic device 100 identifies an orientation or motion of the portable electronic device 100 while the portable electronic device 100 is proximately located to the short-range RF device 110 (Block 602).

After receiving the plurality of commands and identifying the orientation or motion of the portable electronic device 100, the portable electronic device 100 compares the plurality of commands with the orientation or motion that is identified by the portable electronic device 100 (Block 603). For example, in performing this comparison, the portable electronic device 100 may use additional information (e.g., information in an application used by the portable electronic device 100 and/or information from the short-range RF device 110) that associates the plurality of commands with different corresponding motions or orientations.

In response to comparing the plurality of commands with the identified orientation or motion of the portable electronic device 100 (Block 603), the portable electronic device 100 selects and executes (i.e., performs) only one of the plurality of commands by transmitting a request to a network (e.g., to request information from a network node, such as via a request through the Internet and/or a WLAN) to initiate/set-up an upload/download and/or to access a website (Block 604). As an example, each of the plurality of commands may be associated with a different Uniform Resource Locator (URL), and performing the selected one of the plurality of commands includes requesting only the URL associated with that particular command. In various embodiments, each of the URLs may be transmitted by the short-range RF device 110 along (e.g., grouped in a serial data stream) with the associated commands. Alternatively, the URLs may be transmitted separately by the short-range RF device 110, or the URLs may be stored/searched-for/linked-to by an application that is used by the portable electronic device 100.

Figure 7:
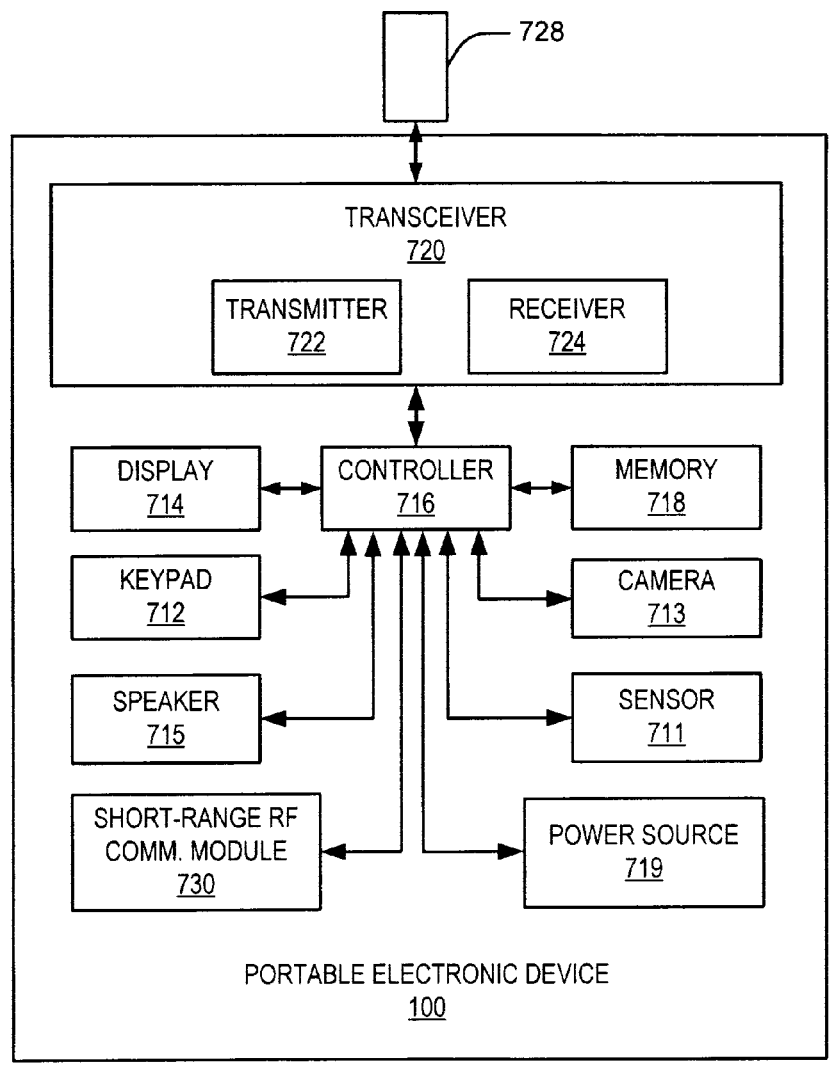
FIG. 7 is a block diagram illustrating the portable electronic device, according to various embodiments of the present inventive concept.

Referring now to FIG. 7, a block diagram is provided illustrating the portable electronic device 100, according to various embodiments of the present inventive concept. The portable electronic device 100 may be any of a variety of portable electronic devices. For example, the portable electronic device 100 may be a mobile terminal (e.g., a mobile telephone), a portable audio player, a portable video player, a camera, an electronic reading device, or a portable computer (e.g., a tablet computer, a netbook computer, or a laptop computer).

As illustrated in FIG. 7, the portable electronic device 100 may include a keypad 712, a display 714, a transceiver 720, a memory 718, a sensor 711, a power source 719, a speaker 715, and a camera 713 that communicate with a controller 716. According to various embodiments, the camera 713 may be configured as a sensor for detecting an orientation or motion of the portable electronic device 100. For example, the camera 713 may determine a direction (or an angle) that the portable electronic device 100 is facing/oriented (e.g., with respect to the short-range RF device 110 or another reference point). According to various embodiments, identifying the orientation or motion of the portable electronic device 100 includes processing information received from the sensor 711 and/or the camera 713 to match the orientation or motion of the portable electronic device 100 to one of a plurality of known (e.g., stored in the memory 718 and/or an application used by the portable electronic device 100) orientations or motions (e.g., rotation, spinning, rightward orientation, etc.).

The controller 716 may include any low-power microprocessor and/or microcontroller used for portable electronic device applications. The controller 716 can include a signal processor. Additionally, or alternatively, a signal processor can be provided as a separate component of the portable electronic device 100.

The transceiver 720 may include a transmitter circuit 722 and a receiver circuit 724, which may cooperate to transmit and receive RF signals via an antenna 728. Although FIG. 7 illustrates that a portion of the antenna 728 extends beyond the housing of the portable electronic device 100, in various embodiments, the antenna 728 may not be visible to a user of the portable electronic device 100 and/or may not protrude from the housing of the portable electronic device 100. According to various embodiments, the transceiver 720 of the portable electronic device 100 may be configured to operate in any of the following bands: Advanced Mobile Phone Service (AMPS), ANSI-136, Global System for Mobile Communications (GSM), Third Generation Partnership Project (3GPP) Long Term Evolution (LTE), General Packet Radio Service (GPRS), enhanced data rates for GSM evolution (EDGE), Digital Communications Services (DCS), Personal Digital Cellular (PDC), Personal Communications Services (PCS), Code Division Multiple Access (CDMA), wideband-CDMA, CDMA2000, and/or Universal Mobile Telecommunications System (UMTS) frequency bands. Other bands can also be used in embodiments according to the inventive concept. Also, various embodiments may be compatible with Long Term Evolution (LTE) and/or High Speed Packet Access (HSPA) standards. Additionally or alternatively, in embodiments, the portable electronic device 100 may be configured to communicate using Global Positioning System (GPS) and/or Wireless Local Area Network (WLAN) frequency bands.

The memory 718 may be a general purpose memory that is used to store both program instructions for the controller 716, as well as data, such as audio data, video data, configuration data, and/or other data that may be accessed and/or used by the controller 716. The memory 718 may include a nonvolatile read/write memory, a read-only memory, and/or a volatile read/write memory. In particular, the memory 718 may include a read-only memory in which basic operating system instructions are stored, a non-volatile read/write memory in which re-usable data, such as configuration information, directory information, and other information may be stored, as well as a volatile read/write memory, in which short-term instructions and/or temporary data may be stored. In various embodiments, the memory 718 may include a removable nonvolatile memory card.

The portable electronic device 100 further includes a short-range RF communication module 730 that may be configured to operate in a peer-to-peer mode and/or in a read/write mode. Other modes of operation, such as card emulation mode, may be possible. The short-range RF communication module 730 is operatively coupled to the controller 716 and can operate under the control of the controller 716.

Still referring to FIG. 7, the sensor 711 may include one or more sensors that are configured to identify a motion or orientation of the portable electronic device 100. For example, the sensor 711 may include at least one of a motion sensor, a rotation sensor, a tap sensor, and a proximity sensor. In various embodiments, the motion sensor may be configured to identify shaking of the portable electronic device 100. The motion sensor may additionally, or alternatively, be configured to identify when the portable electronic device 100 is held substantially still. In various embodiments, the rotation sensor may be configured to detect rotation (e.g., spinning or tilting) in one or more directions.

In various embodiments, the tap sensor and/or the proximity sensor may be configured to identify contact between the portable electronic device 100 and the short-range RF device 110. According to various embodiments, the tap sensor may include a microphone that is configured to detect tapping/knocking on the portable electronic device 100 (e.g., to detect the sound of tapping/knocking on the portable electronic device 100 with a user's finger or with the short-range RF device 110). Moreover, in various embodiments, the tap sensor may include a touch sensor that detects a touch (e.g., by a user's finger) on a portion (e.g., a touch screen of the display 714) of the portable electronic device 100. Furthermore, in various embodiments, the tap sensor may include an accelerometer that is configured to detect tapping/knocking on the portable electronic device 100.

Accordingly, referring still to FIG. 7, the portable electronic device 100 may include a short-range RF communication module 730 that is configured to receive at least one of the first command 104 and the second command 106 (illustrated in FIG. 1) from the proximately-located short-range RF device 110 (e.g., through the short-range RF communication link 105). The portable electronic device 100 may further include a sensor (e.g., the sensor 711 and/or the camera 713) that is configured to identify occurrence of one of a plurality of device gestures that are made by motion or orientation of the portable electronic device 100 while proximately located to the short-range RF device 110.

According to various embodiments, the portable electronic device 100 and the short-range RF device 110 may be different types of devices. For example, the portable electronic device 100 may be a battery-powered device (e.g., the power source 719 may include a battery), and the short-range RF device 110 may not be battery-powered, but rather may receive power from an external source (e.g., from signals transmitted by the portable electronic device 100). Accordingly, the power source 719 of the portable electronic device 100 may power the short-range RF device 110 through magnetic coupling. Additionally or alternatively, the portable electronic device 100 may include a display device (e.g., the display 714) and/or a keypad (e.g., the keypad 712), whereas the short-range RF device 110 may not have a display and/or a keypad. Moreover, in various embodiments, the short-range RF device 110 may be an NFC tag that is configured to provide the plurality of commands (e.g., the first command 104 and the second command 106 illustrated in FIG. 1) to the portable electronic device 100, but that may not be configured to execute the plurality of commands. For example, the short-range RF device 110 may not be configured to download/play music or videos, or to open a hyperlink, even though the short-range RF device 110 may command such actions by the plurality of commands that it transfers to the portable electronic device 100 (which is configured to execute the plurality of commands).

In various embodiments, the portable electronic device 100 may be commanded by the selected one of the plurality of commands to selectively activate a portion of the portable electronic device 100, in response to detecting (e.g., via the sensor 711 and/or the camera 713) a particular orientation or motion of the portable electronic device 100. For example, the portable electronic device 100 may be commanded to open a web browser or a multimedia application (e.g., music player or video player) in response to detecting a particular orientation or motion. In other words, although the plurality of commands may operate in various embodiments by transmitting requests to a network, the plurality of commands may additionally or alternatively command actions that are specific to (and/or confined within) the portable electronic device 100 itself. Thus, according to various embodiments, the plurality of commands may command specific actions (e.g., starting a function or application on the portable electronic device 100, or choosing a setting of the portable electronic device 100) that are specific to (and/or confined within) the portable electronic device 100.

Figure 8:
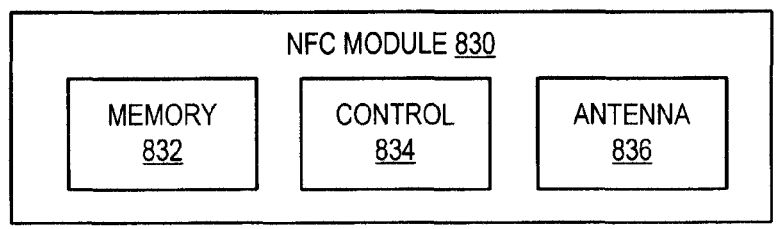
FIG. 8 is a block diagram illustrating an NFC module, according to various embodiments of the present inventive concept.

Referring now to FIG. 8, a block diagram is provided illustrating an NFC module 830, according to various embodiments of the present inventive concept. For example, the short-range RF communication module 730 of the portable electronic device 100 illustrated in FIG. 7 may include the NFC module 830. Also, the short-range RF communication link 105 illustrated in FIG. 1 may be an NFC link. As illustrated in FIG. 8, the NFC module 830 may include an antenna 836, a control circuit 834, and a memory 832. The antenna 836 may include a loop antenna that is tuned to transmit/receive electromagnetic signals at a frequency of about 13.56 MHz. The control circuit 834 controls operation of the NFC module 830, and can include a microprocessor or other control circuitry. The memory 832 can store data and/or settings used by the control circuit 834 in performing NFC communications. The control circuit 834 can operate in response to instructions from the controller 716 of the portable electronic device 100 illustrated in FIG. 7. In particular, the controller 716 of the portable electronic device 100 can execute a communication Application Programming Interface (API) that controls operation of the NFC module 830 illustrated in FIG. 8. The communication API permits application programs executing on the portable electronic device 100 to query and exchange data with other NFC-enabled devices according to one or more of the NFC operational modes, such as read/write mode and peer-to-peer mode.

Figure 9A:
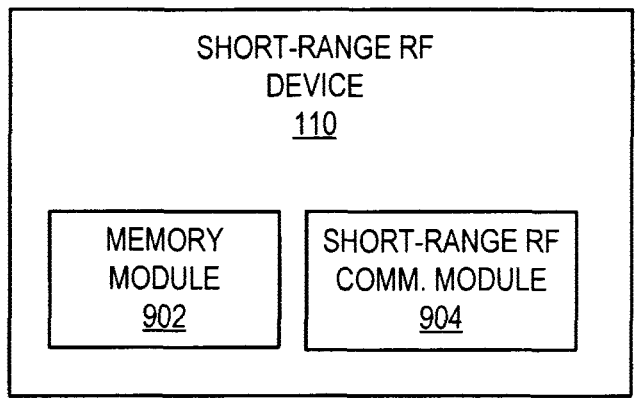
FIGS. 9A and 9B are block diagrams illustrating the short-range RF device, according to various embodiments of the present inventive concept.
Figure 9B:
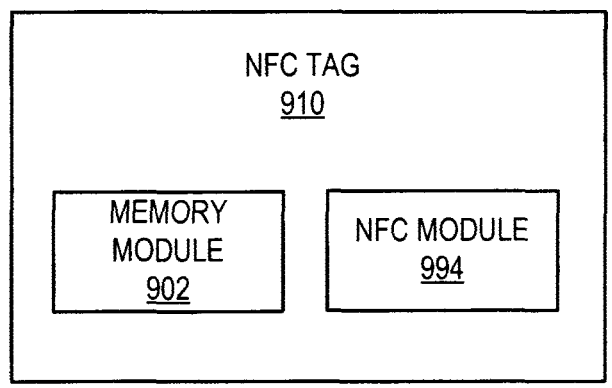

Referring now to FIGS. 9A and 9B, block diagrams are provided illustrating the short-range RF device 110, according to various embodiments of the present inventive concept. As illustrated in FIG. 9A, the short-range RF device 110 may include a short-range RF communication module 904. The short-range RF communication module 904 may be configured to communicate with the portable electronic device 100 through the short-range RF communication link 105, as described with respect to the operations illustrated in FIGS. 3-6. Additionally, the short-range RF device 110 may include a memory module 902, which may store a plurality of commands (e.g., the first and second commands 104 and 106).

As illustrated in FIG. 9B, the short-range RF communication module 904 may include an NFC module 994 in various embodiments. Accordingly, the short-range RF device 110 may be an NFC tag 910, and the short-range RF communication link 105 may be an NFC link. According to various embodiments, the NFC module 994 may be configured to operate in a passive mode. In other words, the NFC module 994 may not have a separate power source, and may therefore operate using power derived from signals transmitted by the portable electronic device 100.

Figure 10A:
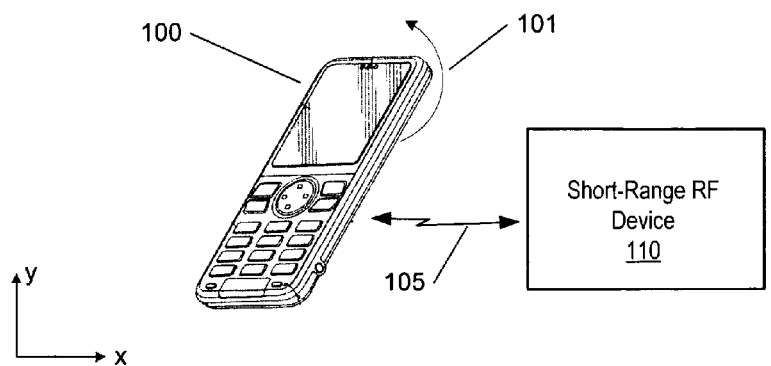
FIGS. 10A-10F illustrate orientations and motions of the portable electronic device, according to various embodiments of the present inventive concept.

Referring now to FIGS. 10A-10F, orientations and motions of the portable electronic device 100 are illustrated, according to various embodiments of the present inventive concept. As illustrated in FIG. 10A, the portable electronic device 100 may perform a motion in the form of a rotation 101. The rotation 101 may be clockwise or counterclockwise. In one example, the rotation 101 may be a spin around the y-axis that is illustrated in FIG. 10A. In particular, the rotation 101 may include circling (e.g., spinning 360 degrees, or more, around) the y-axis one or more times, or partially circling (e.g., spinning fewer than 360 degrees around) the y-axis.

Figure 10B:
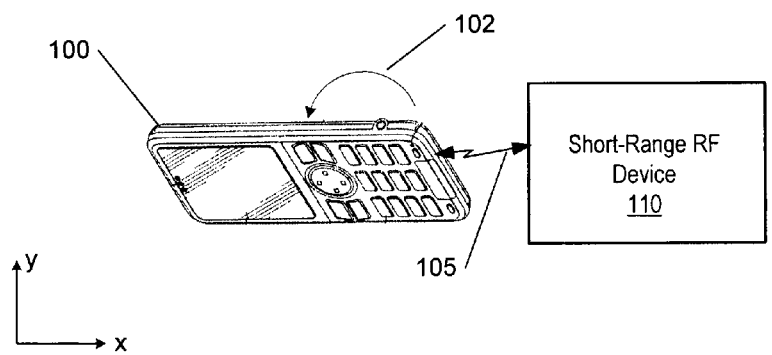

As illustrated in FIG. 10B, the portable electronic device 100 may perform a motion in the form of a tilt 102. The tilt 102 may including rotating around the x-axis. For example, the tilt 102 may include rotating 45 degrees around the x-axis. Also, the tilt 102 may be a flip of the portable electronic device 100. For example, the portable electronic device 100 may be flipped from right-side-up to up-side-down (e.g., the tilt 102 may include about 180 degrees of rotation), or vice versa.

In various embodiments, the rotation 101 and/or the tilt 102 of the portable electronic device 100 may be determined while proximately located to the short-range RF device 110. For example, the rotation 101 and/or the tilt 102 may be identified with respect to a portion (e.g., the display 714) of the portable electronic device 100 that rotates and/or tilts (e.g., toward or away from the short-range RF device 110). In one example, the portable electronic device 100 may perform a motion in the form of the tilt 102 such that the tilt 102 orients the display 714 of the portable electronic device 100 in a direction facing the short-range RF device 110.

Moreover, the portable electronic device 100 may perform a motion in the form of a shake (e.g., a user may shake the portable electronic device 100). For example, the sensor 711 may include one or more gyroscopes and/or accelerometers configured to detect a shake of the portable electronic device 100. In particular, referring to FIGS. 7, 10A, and 10B, the sensor 711 may be configured to detect the shake by detecting motion of the portable electronic device 100 (e.g., by detecting motion along the x-axis, the y-axis, and/or an axis substantially perpendicular to the x-axis or the y-axis). Although the example of a shake is provided herein, it will be understood that gyroscopes and/or accelerometers may also be used to detect various other motions/orientations.

Figure 10C:
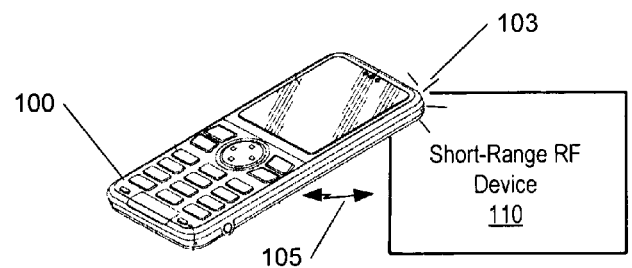

As illustrated in FIG. 10C, the portable electronic device 100 may perform a device motion/gesture in the form of contact 103 with the portable electronic device 100. For example, the contact 103 may be performed if the portable electronic device 100 taps one or more times against the short-range RF device 110. In another example, the contact 103 may be performed if a user of the portable electronic device 100 taps/knocks a portion (e.g., a housing or the display 714) of the portable electronic device 100 with a finger or a stylus.

The device motions/gestures of rotation 101, tilt 102, and contact 103 illustrated in FIGS. 10A-10C may be detected by one or more sensors (e.g., the sensor 711 and/or the camera 713) of the portable electronic device 100. Additionally or alternatively, in various embodiments, these and/or other device gestures may be detected by one or more external sensors (e.g., cameras near the short-range RF device 110).

Figure 10D:
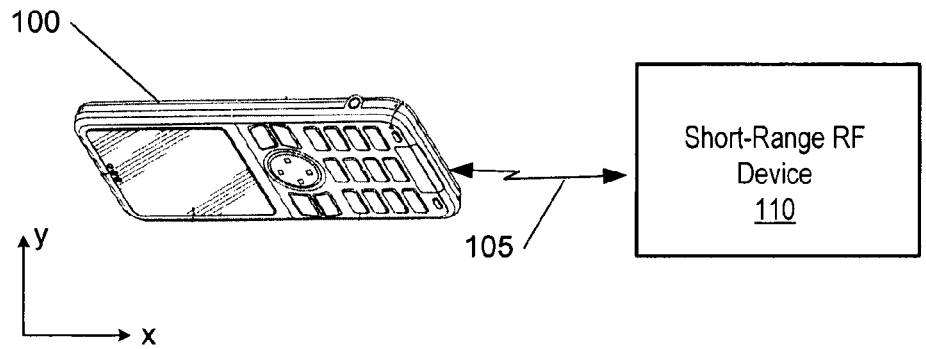

As illustrated in FIG. 10D, the portable electronic device 100 may have an orientation to the left along the x-axis. For example, the top of the portable electronic device 100 may be pointing to the left along the x-axis. In various embodiments, this leftward orientation of the portable electronic device 100 may be identified by the portable electronic device 100 (e.g., by the sensor 711 and/or the camera 713) while proximately located to the short-range RF device 110.

Figure 10E:
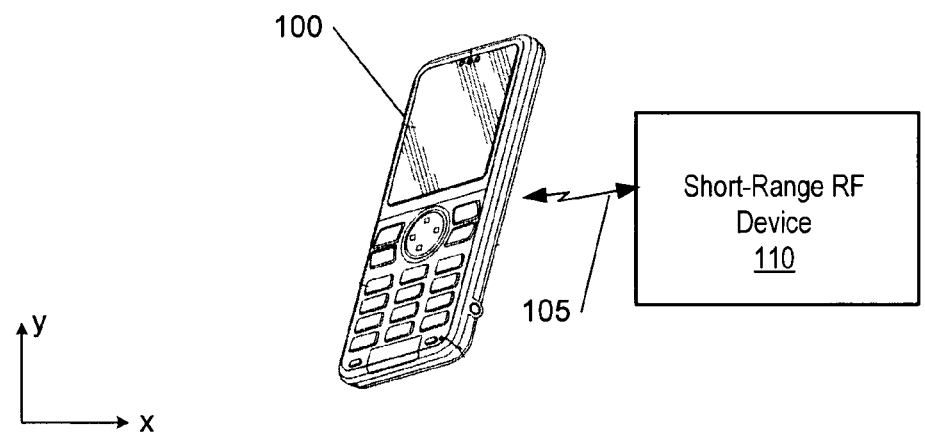

Also, as illustrated in FIG. 10E, the portable electronic device 100 may have an upward orientation. For example, the top of the portable electronic device 100 may be pointing up (e.g., away from the ground) along the y-axis.

Figure 10F:
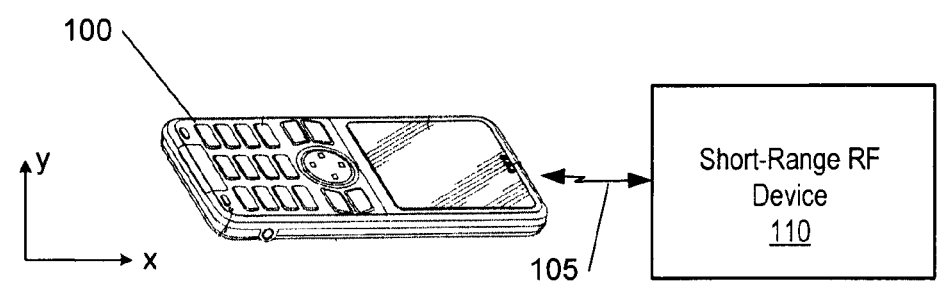

Additionally, as illustrated in FIG. 10F, the portable electronic device 100 may have an orientation to the right along the x-axis. For example, the top of the portable electronic device 100 may be pointing to the right along the x-axis.

In various embodiments, the motions/orientations illustrated in FIGS. 10A-10F of the portable electronic device 100 may be identified by the portable electronic device 100 while proximately located to the short-range RF device 110. In response to identifying a particular one of the motions/orientations of the portable electronic device 100, the portable electronic device 100 may select and perform one of the plurality of commands. For example, in response to identifying a rightward orientation of the portable electronic device 100, as illustrated in FIG. 10F, the portable electronic device 100 may select and perform the particular command that corresponds with the rightward orientation. Additionally, although leftward, upward, and rightward orientations of the portable electronic device 100 are described, it will be understood that other orientations (e.g., diagonal, downward, etc.) of the portable electronic device 100 may additionally or alternatively be used to trigger the selection and execution of particular ones of the plurality of commands transmitted by the short-range RF device 110.

Figure 11:
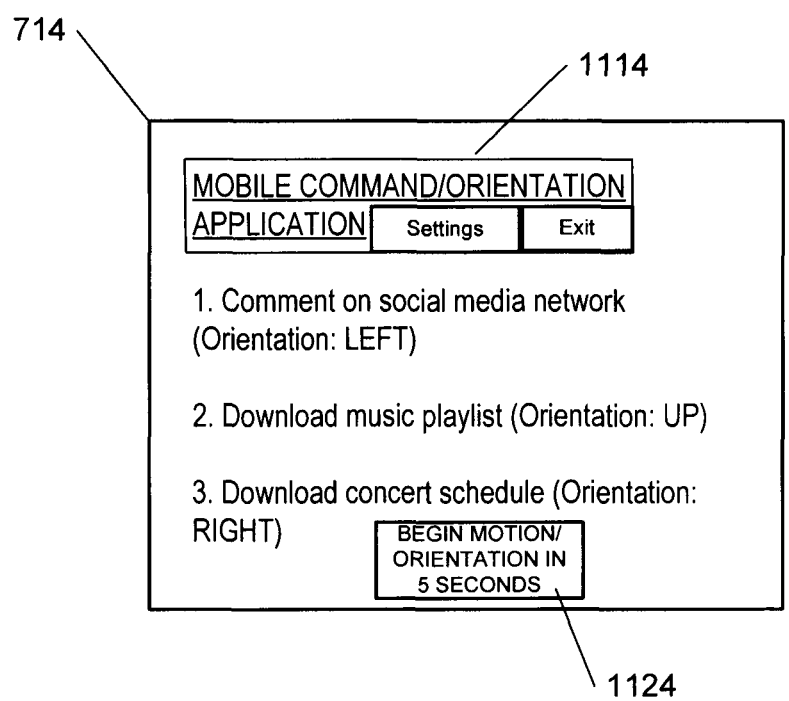
FIG. 11 illustrates a list of commands and corresponding orientations on a display of the portable electronic device, according to various embodiments of the present inventive concept.

Referring now to FIG. 11, a list of commands and corresponding orientations of the portable electronic device 100 are illustrated on a display device 714 of the portable electronic device 100, according to various embodiments of the present inventive concept. For example, a user of the portable electronic device 100 may approach the short-range RF device 110 at a music concert, and the displayed list may include commands pertinent to a fan at that concert. The list may include each of the plurality of commands that is transmitted from the short-range RF device 110 to the portable electronic device 100. As an example, the list may include: (1) a command to interact with a social media network (e.g., to post a comment/indication-of-approval and/or audio/video/images to a social media website); (2) a command to access/download audio/video/images (e.g., to download music or lyrics or a playlist); and (3) a command to download a concert schedule. The list of commands may be presented on the display device 714 when the portable electronic device 100 is connected to the short-range RF device 110 via the direct point-to-point short-range RF communication link 105. Additionally, a corresponding motion or orientation may be displayed with each of the displayed commands. In other words, the display device 714 may indicate that a leftward orientation of the portable electronic device 100 will trigger selection and performance of command (1), whereas an upward orientation will trigger selection and performance of command (2) and a rightward orientation will trigger selection and performance of command (3).

As another example, a user of the portable electronic device 100 may approach the short-range RF device 110 in a store (e.g., a retail store). A leftward orientation of the portable electronic device 100 while proximately located to the short-range RF device 110 may trigger selection and performance of a command to update the user's location on a social media website (i.e., to indicate via the social media website that the user is in the store). In contrast, an upward (i.e., vertical) orientation of the portable electronic device 100 may trigger selection and performance of a command to download and display (on the display device 714) current special offers or rebates. Alternatively, a rightward orientation of the portable electronic device 100 may trigger selection and performance of a command to download and display a current status of the user's account (e.g., a credit account or a rewards/loyalty account) with the store. Furthermore, a spinning motion of the portable electronic device 100 may trigger selection and performance of a command to download and display technical specifications of a product in the store.

Additionally, according to various embodiments, an indication may be provided on the display device 714 of the portable electronic device 100 regarding when the portable electronic device 100 will identify the motion or orientation thereof. For example, along with displaying a list of commands and corresponding motions/orientations, an alert 1124 may be provided on the display device 714 in the form of a countdown to tell a user to begin a motion/orientation of the portable electronic device 100 after a given amount of time (e.g., after 5 . . . 4 . . . 3 . . . 2 . . . 1 seconds). Alternatively, the alert 1124 may provide an indication that the user may "BEGIN MOTION/ORIENTATION NOW," without going through a countdown.

According to various embodiments, the portable electronic device 100 may receive from the short-range RF device 110 indications of the corresponding motions/orientations that will trigger selection and performance of each of the respective commands. The portable electronic device 100 may then display information communicating the indications on the display device 714 of the portable electronic device. For example, the short-range RF device 110 may transmit (either together with each command, or as a separate transmission) an indication of the corresponding motion or orientation that will trigger the associated command, and the display device 714 may display this information in the form of a list. This list may be displayed before and/or after identifying the orientation or motion of the portable electronic device 100. In other words, although various embodiments provide for displaying the list before identifying a motion/orientation and selecting a command, various other embodiments provide for completing the operations of identifying a motion/orientation and selecting a command before (or even without) displaying the list. Accordingly, a user of the portable electronic device 100 may not need to look at the display device 714 before completing the operations of identifying a motion/orientation and selecting a command.

Additionally or alternatively, the portable electronic device 100 may use an application 1114 that associates each of the plurality of commands with a corresponding orientation or motion that will trigger selection and performance of a respective one of the plurality of commands. The application 1114 may be displayed on the display device 714 of the portable electronic device 100. According to various embodiments, the portable electronic device 100 may compare the plurality of commands with an identified motion or orientation of the portable electronic device 100 using the application 1114. The application 1114 may thus be used to select one command from the plurality of commands. In various embodiments, the application 1114 may store/search-for/link-to/access URLs that correspond to the plurality of commands. For example, the application 1114 may perform a particular command by requesting a URL (e.g., to access a social media website or a music website) corresponding to that command. The different URLs corresponding to the different ones of the plurality of commands may be for different merchants' websites or for different pages/functions of the same merchant's website (e.g., different actions on the same social media network).

As described herein, motions/orientations of the portable electronic device 100 may trigger selection and performance of various commands. Additionally, in various embodiments, the portable electronic device 100 may use an application 1114 that is personalizable/customizable. For example, a user may have a short-range RF device 110 (e.g., an NFC tag 910) in the user's car. By using/programming the settings of the application 1114 to personalize/customize the application 1114, the user may determine that a particular motion or orientation executes a particular one of the plurality of commands that are transmitted as a group from the NFC tag 910 to the portable electronic device 100. For example, the NFC tag 910 in the user's car may transmit commands to the portable electronic device 100 for a navigational system and/or may transmit commands for accessing music on/with the portable electronic device 100. As an example, a user may personalize/customize the application 1114 to determine that a rightward orientation of the portable electronic device 100 will trigger selection and performance of a command to access a website for a nearby merchant (e.g., a restaurant, retailer, or hotel) when using the navigational system, whereas a spinning motion of the portable electronic device 100 will trigger selection and performance of a command to download/access music (e.g., from a streaming music service or from a music store that sells downloads).

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

The invention claimed is:
1. A method of responding to an orientation or motion of a portable electronic device, comprising:

receiving a plurality of commands at the portable electronic device from a proximately-located short-range radio frequency (RF) device through a direct point-to-point short-range RF communication link;

receiving from the short-range RF device at the portable electronic device an indication of a corresponding orientation or motion that will trigger performing a respective one of the plurality of commands;

displaying information communicating the indication on a display device of the portable electronic device;

identifying the orientation or motion of the portable electronic device while the portable electronic device is proximately located to the short-range RF device; and selecting one of the plurality of commands, at the portable electronic device, in response to identifying the orientation or motion of the portable electronic device, wherein displaying the information comprises:
before identifying the orientation or motion of the portable electronic device, displaying on the display device of the portable electronic device a list that identifies each of the plurality of commands, along with a respective orientation or motion that corresponds to each of the plurality of commands, and wherein selecting one of the plurality of commands is performed by the portable electronic device independent of input received via a keypad, keyboard, or touch interface.

2. The method of claim 1,
wherein the plurality of commands are received at the portable electronic device through a magnetically-coupled near field communication (NFC) link,
wherein the short-range RF device comprises an NFC tag, and
wherein the method further comprises powering the NFC tag through magnetic coupling to a power source of the portable electronic device to initiate transfer of the plurality of commands to the portable electronic device through the NFC link.

3. The method of claim 1, wherein selecting one of the plurality of commands comprises the following actions by the portable electronic device:
interpreting the plurality of commands; and
performing the one of the plurality of commands that is selected by the portable electronic device without further input from a user.

4. The method of claim 3,
wherein performing the one of the plurality of commands that is selected comprises transmitting a request from the portable electronic device to a network to request information from a network node,
wherein transmitting the request from the portable electronic device to a network comprises requesting a uniform resource locator (URL) that is included in the one of the plurality of commands that is selected by the portable electronic device, and
wherein each of the plurality of commands is associated with a different URL.

5. The method of claim 3, wherein interpreting the plurality of commands comprises comparing the plurality of commands with the orientation or motion that is identified by the portable electronic device.

6. The method of claim 5, wherein comparing the plurality of commands with the orientation or motion that is identified by the portable electronic device comprises using an application that associates each of the plurality of commands with a corresponding orientation or motion that will trigger performing a respective one of the plurality of commands.

7. The method of claim 1, wherein identifying the orientation or motion of the portable electronic device comprises processing information received from a motion sensor, a rotation sensor, a tap sensor, a proximity sensor, and/or camera of the portable electronic device while the portable electronic device is proximately located to the short-range RF device, to match the orientation or motion of the portable electronic device to one of a plurality of known orientations or motions.

8. The method of claim 1, wherein identifying the orientation or motion of the portable electronic device is triggered in response to receiving the plurality of commands at the portable electronic device.

9. The method of claim 1, wherein:
the short-range RF device transmits each of the plurality of commands to the portable electronic device grouped in a serial data stream; and
selecting one of the plurality of commands comprises selecting only one of the plurality of commands.

10. The method of claim 1, wherein receiving the plurality of commands and receiving the indication comprises:
receiving the indication of the corresponding orientation or motion together with receiving the respective one of the plurality of commands.

11. The method of claim 1, wherein receiving the plurality of commands and receiving the indication comprises:
receiving the indication of the corresponding orientation or motion in a separate transmission from the respective one of the plurality of commands.

12. A portable electronic device, comprising:
a short-range radio frequency (RF) communication module configured to receive a plurality of commands from a proximately-located short-range RF device through a direct point-to-point short-range RF communication link;
a display device configured to display an indication of an orientation or motion of the portable electronic device that will trigger performing a respective one of the plurality of commands; and
a sensor configured to identify occurrence of the orientation or motion of the portable electronic device while proximately located to the short-range RF device, the portable electronic device being further configured to select one of the plurality of commands in response to identifying the occurrence of the orientation or motion of the portable electronic device and independent of input received via a keypad, keyboard, or touch interface,
wherein the display device is configured to display a list that identifies each of the plurality of commands, along with a respective orientation or motion that corresponds to each of the plurality of commands, before the sensor identifies the occurrence of the orientation or motion of the portable electronic device.

13. The portable electronic device of claim 12, wherein:
the short-range RF communication module comprises a near field communication (NFC) module;
the short-range RF communication link comprises a magnetically-coupled NFC link;
the short-range RF device comprises an NFC tag that is powered through magnetic coupling to a power source of the portable electronic device; and
the sensor comprises at least one of a motion sensor, a rotation sensor, a tap sensor, a proximity sensor, and a camera.

14. The portable electronic device of claim 12, wherein selecting one of the plurality of commands comprises:

comparing the plurality of commands with the orientation or motion of the portable electronic device that is identified by the sensor; and performing the one of the plurality of commands that is selected.

15. The portable electronic device of claim 14, further comprising a transceiver, wherein:

performing the one of the plurality of commands that is selected comprises transmitting a request via the transceiver to a network;

transmitting the request via the transceiver to a network comprises requesting a uniform resource locator (URL);

the URL is associated with the one of the plurality of commands that is selected by the portable electronic device; and each of the plurality of commands is associated with a different URL.

16. A method of responding to an orientation or motion of a portable electronic device, comprising:

receiving a plurality of commands grouped in a serial data stream at the portable electronic device from a proximately-located short-range radio frequency (RF) device through a direct point-to-point short-range RF communication link;

displaying, on a display device of the portable electronic device, an indication of a corresponding orientation or motion that will trigger performing a respective one of the plurality of commands;

identifying the orientation or motion of the portable electronic device while the portable electronic device is proximately located to the short-range RF device;

comparing the plurality of commands with the orientation or motion that is identified by the portable electronic device; and performing only one of the plurality of commands, by transmitting a request from the portable electronic device to a network to initiate a download and/or access a website, in response to comparing the plurality of commands with the orientation or motion that is identified by the portable electronic device, wherein displaying the indication comprises:

before identifying the orientation or motion of the portable electronic device, displaying on the display device of the portable electronic device a list that identifies each of the plurality of commands, along with a respective orientation or motion that corresponds to each of the plurality of commands, and wherein performing only one of the plurality of commands comprises using the portable electronic device to select only one of the plurality of commands, independent of input received via a keypad, keyboard, or touch interface.

* * * * *